(12) United States Patent
Donley

(10) Patent No.: US 7,293,141 B1
(45) Date of Patent: Nov. 6, 2007

(54) CACHE WORD OF INTEREST LATENCY ORGANIZATION

(75) Inventor: Greggory D. Donley, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 338 days.

(21) Appl. No.: 11/048,350

(22) Filed: Feb. 1, 2005

(51) Int. Cl.
*G06F 12/00* (2006.01)
*G06F 13/00* (2006.01)

(52) U.S. Cl. .................. 711/118; 711/100; 711/154

(58) Field of Classification Search ................ 711/100, 711/118, 127, 129, 154, 173
See application file for complete search history.

(56) References Cited

U.S. PATENT DOCUMENTS

| | | | | |
|---|---|---|---|---|
| 4,424,561 | A * | 1/1984 | Stanley et al. ................ | 711/3 |
| 5,091,851 | A * | 2/1992 | Shelton et al. .............. | 711/128 |
| 5,732,241 | A * | 3/1998 | Chan .......................... | 711/131 |
| 6,098,152 | A * | 8/2000 | Mounes-Toussi ........... | 711/134 |
| 6,965,969 | B2 * | 11/2005 | Burger et al. ............... | 711/128 |
| 2005/0223172 | A1 * | 10/2005 | Bortfeld ...................... | 711/125 |
| 2006/0041720 | A1 * | 2/2006 | Hu et al. ..................... | 711/136 |
| 2006/0112228 | A1 * | 5/2006 | Shen .......................... | 711/133 |

OTHER PUBLICATIONS

Patterson, David and Hennessy, John. Computer Architecture: A Quantitative Approach, 3rd Ed. Morgan Kaufmann Publishers, 2003. p. 418.*

Chishti, Zeshan, et al., "Distance Associativity for High-Performance Energy-Efficient Non-Uniform Cache Architectures," Proceedings of the 36th International Symposium on Microarchitecture (MICRO-36'03); IEEE Computer Society, 2003, 12 pages.

Cragon, Harvey G., *Memory Systems and Pipelined Processors*, Jones and Bartlett Publishers, 1996, pp. 15-34 and 91-95.

Kim, Changkyu, et al., "An Adaptive, Non-Uniform Cache Structure for Wire-Delay Dominated On-Chip Caches," Proceedings of the 10th International Conference on Architectural Support for Programming Languages and Operating Systems (ASPLOS), 2002, pp. 1-12.

Patterson, David A., et al., *Computer Architecture A Quantitative Approach*, Morgan Kaufmann Publishers, Inc., 1990, pp. 408-425.

* cited by examiner

*Primary Examiner*—Tuan V. Thai
(74) *Attorney, Agent, or Firm*—Zagorin O'Brien Graham LLP

(57) ABSTRACT

Techniques for improving cache latency include distributing cache lines across regions of the cache having various latencies. The latencies of the regions may vary as a function of the distance between an individual region of the cache and a cache controller. The cache controller may predict an addressable unit of interest for a next access to a data line stored in a cache line. The predicted addressable unit of interest is stored in a region of the cache having the lowest latency as compared to other regions of the cache. The addressable unit of interest may be a most-recently used addressable unit, an addressable unit sequentially following a most-recently used addressable unit, or determined by other criterion. The invention contemplates using at least one control bit to indicate which addressable unit is stored in the region having the lowest latency.

29 Claims, 3 Drawing Sheets

CACHE WORD OF INTEREST LATENCY ORGANIZATION

BACKGROUND

1. Field of the Invention

The present invention relates to integrated circuit memory systems, and more particularly to cache memory systems.

2. Description of the Related Art

In typical hierarchical memory systems, cache memories are small, fast memory circuits that store most-recently accessed code or data to reduce the latency (i.e., the total time between the start and completion) of references to memory. The performance of execution units or processors accessing the cache typically depends on the latency of receiving data from the cache. As integrated circuit die sizes increase and integrated circuit manufacturing process geometries decrease, the size of a cache that may be implemented on an integrated circuit die increases. In general, as cache size increases, the time to access data within the cache increases, reducing the performance benefits of using a larger cache. Thus, improved techniques for storing data in cache memories are desired.

SUMMARY

Techniques for improving cache latency include distributing cache lines across regions of the cache having various latencies. The latencies of the regions may vary as a function of the distance between an individual region of the cache and a cache controller. The cache controller may predict an addressable unit of interest for a next access to a data line stored in a cache line. The predicted addressable unit of interest is stored in a region of the cache having the lowest latency as compared to other regions of the cache. The addressable unit of interest may be a most-recently used addressable unit, an addressable unit sequentially following a most-recently used addressable unit, or determined by other criterion. The invention contemplates using at least one control bit to indicate which addressable unit is stored in the region having the lowest latency.

In one or more embodiments of the present invention, a cache memory includes a first region and at least a second region. The first and second regions have a first latency with respect to an access by a cache control circuit and a second latency with respect to an access by a cache control circuit, respectively. The first latency is based at least in part on a distance between the first region and the cache control circuit. The second latency is based at least in part on a distance between the second region and the cache control circuit. The second latency is greater than the first latency. The cache memory circuit is addressable to load and store lines of data allocated to the cache memory circuit. The lines of data include multiple addressable units of data. The cache memory circuit is organized to store a first addressable unit of an individual data line in the first region and a second addressable unit of the individual data line in the second region. In one or more embodiments of the invention, the first and second addressable units of an individual data line are stored in a non-zero-word order based at least in part on a prediction of a requested addressable unit for a next access of the data line.

In one or more embodiments of the invention, a method of operating a memory system includes allocating a data line to a cache memory circuit including cache lines distributed across at least a first region of the cache memory circuit and a second region of the cache memory circuit. The first region of the cache memory circuit has a first latency based at least in part on a distance between the first region and a cache control circuit. The second region of the cache memory circuit has a second latency based at least in part on a distance between the second region and the cache control circuit. The second latency is greater than the first latency. In one or more embodiments of the invention, the method includes predicting a next requested addressable unit of the data line and storing the data line in the cache memory circuit accordingly. The prediction is based at least in part on a prior access of the data line.

In one or more embodiments of the invention, a method of manufacturing a memory system includes forming a cache control circuit, at least one execution unit coupled to the cache control circuit, a cache memory circuit, a first set of conductors, and a second set of conductors. The cache memory circuit includes a plurality of cache lines. At least one cache line includes at least a first portion and a second portion. The first and second portions store respective ones of first and second addressable units of an individual data line. The first set of conductors couple the first portion of the cache line to the cache control circuit. The second set of conductors couple the second portion of the cache line to the cache control circuit. The first set of conductors is associated with a first delay and the second set of conductors is associated with a second delay. The second delay is greater than the first delay. The method may form control bits corresponding to the cache line. The control bits include at least one bit for identifying which of a plurality of addressable units of the individual data line is stored in the first portion.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
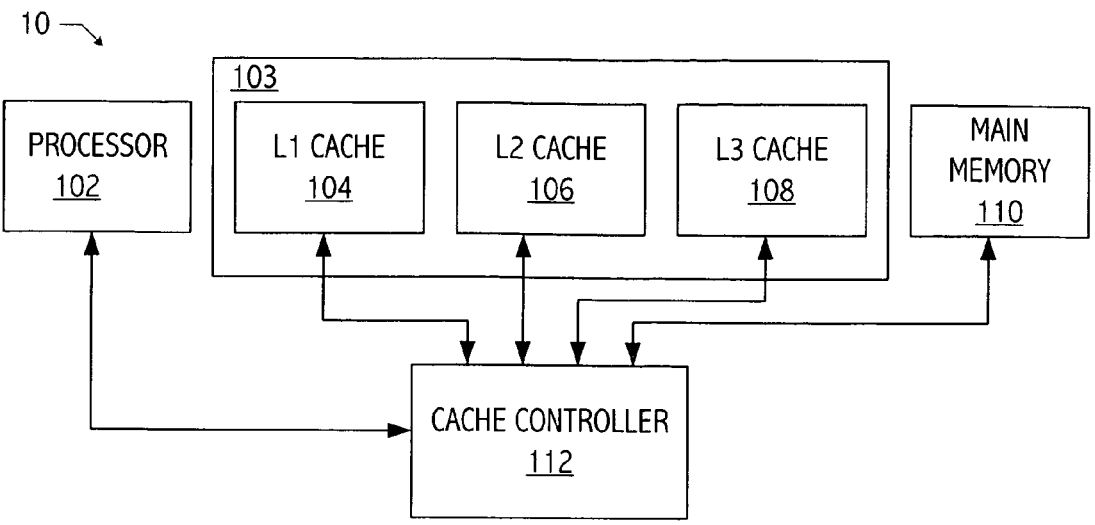
FIG. 1 illustrates a hierarchical memory system consistent with one or more embodiments of the present invention.

Referring to FIG. 1, a typical hierarchical memory system (e.g., memory system 10) includes a cache (e.g., cache 103), a main memory (e.g., main memory 110), a cache control circuit (e.g., cache controller 112), and one or more execution units and/or processors (e.g., processor 102). The execution unit or processor, cache control circuit, and cache may reside on a single integrated circuit. Cache 103 may be a single-level cache or a multi-level cache (e.g. a three level cache, as shown in FIG. 1). In general, the storage capacity of individual levels of a multi-level cache increases with increasing cache level while the cost and speed decreases with increasing cache level. The term "cache," as used hereinafter, refers to a single-level cache or at least one level of a multi-level cache (e.g., level-three of a three level cache), unless otherwise specified. The term "cache control circuit," as used herein, refers to a circuit, sub-circuit, or other device that attempts to control the state of a corresponding cache. Although cache controller 112 is illustrated as being separate from processor 102, cache 103, and main memory 110, a cache control circuit may be included, for example, as part of a cache, execution unit or processor, or other portion of a system including a cache.

Figure 2:
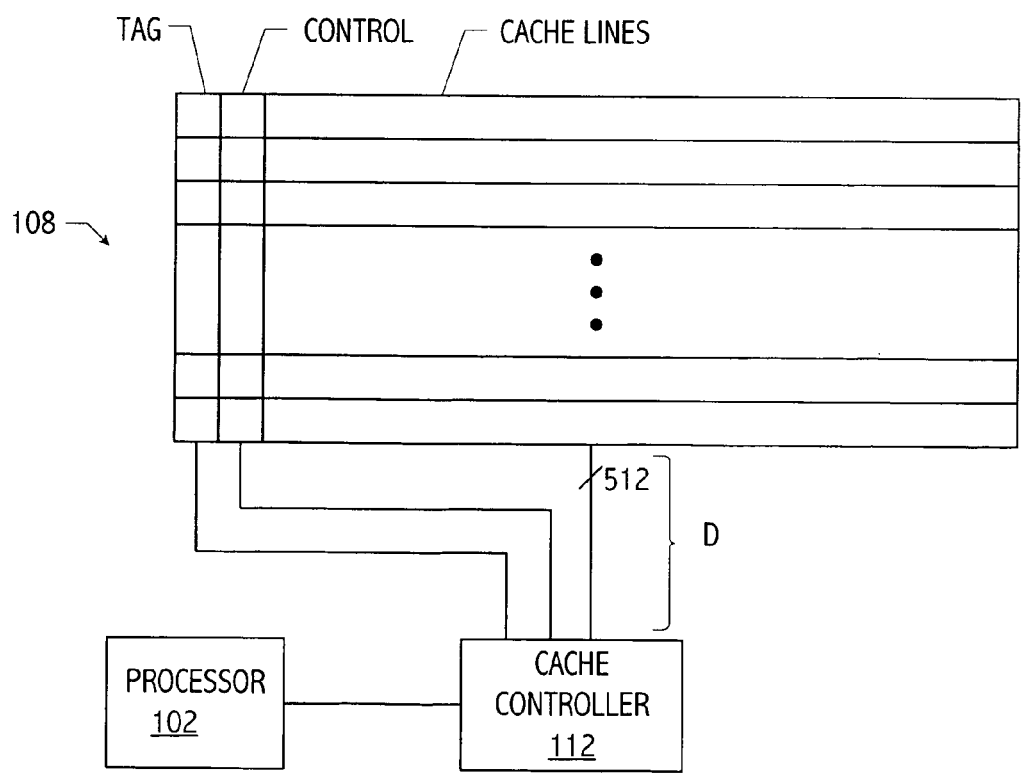
FIG. 2 illustrates a typical cache memory system.

Cache 108 may include control bits, e.g., CONTROL, and TAG bits. Referring to FIG. 2, CONTROL typically includes state information, e.g., information useful for maintaining data coherency with respect to main memory. Due to a limited, although large, cache size, only a portion of the data available to the execution unit or processor can reside in the cache at a particular time. Typically, partial addresses, i.e., tags, indicate which data lines are present in the cache. If an address matches a tag, then the data line is present, otherwise, the data line is not present. Cache 108 may provide a small number of alternative locations for storing a particular address within the cache to minimize contention with other addresses for presence in the cache. These locations are called a set, and such a cache is known as a set associative cache. If n blocks are in a set, the cache is referred to as n-way set associative.

A typical memory architecture assumes that each level in the cache hierarchy has a single, uniform latency. Cache 108 is assumed to have a uniform latency that is based on a worst case latency of individual bits of the cache line. The latency of cache 108 is based at least in part on a wire delay (i.e., a delay through a conductor coupling cache lines to a cache control circuit) of D. As the size of cache 108 increases, wire delays may increase, and in some circumstances, the wire delays between the cache and a cache control circuit may be a significant or even dominant component of the cache latency. In cache 108, data residing in regions of the cache that are close to cache controller 112 may have shorter wire delays and may be accessed significantly faster (i.e., at least one clock cycle faster) than data residing in regions farther from the cache control circuit. However, in a typical cache, the uniform cache latency will be based on the worst-case wire delay.

Figure 3:
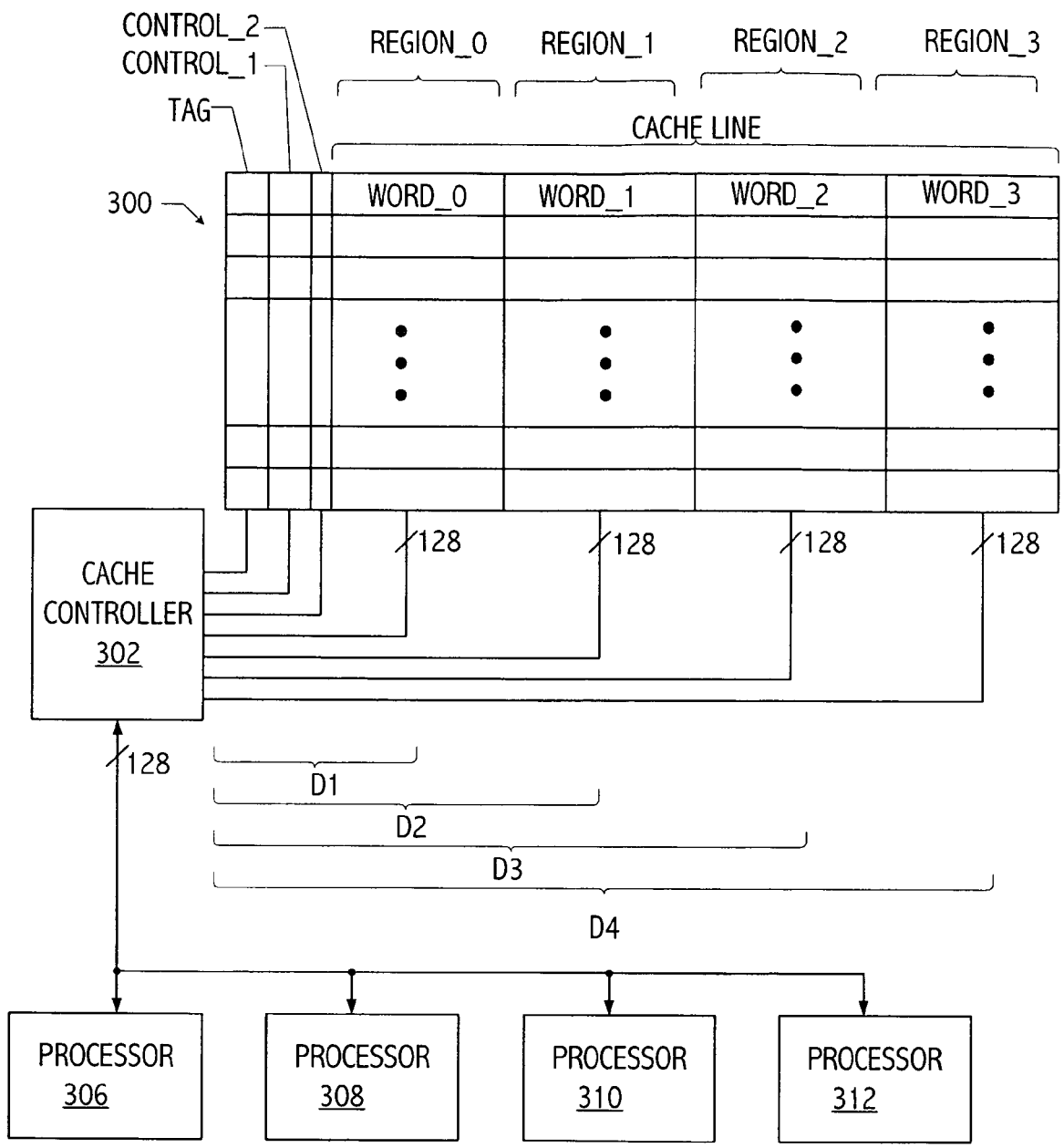
FIG. 3 illustrates a cache memory system consistent with one or more embodiments of the present invention.

One technique for physically organizing such a multi-region cache includes distributing individual cache lines across the regions of varying latencies so that at least one portion (e.g., a word or other addressable unit) of an individual cache line is available with a latency lower than other portions (e.g., other words or addressable units) of the cache line. For example, cache 300 of FIG. 3 is apportioned into multiple regions (e.g., REGION_0, REGION_1, REGION_2, and REGION_3) during integrated circuit layout and floorplanning. An individual region has a latency based at least in part on the distance between the individual region and the cache control circuit (e.g., cache controller 302) responsive to references to the cache.

For example, REGION_0, REGION_1, REGION_2, and REGION_3 have latencies D1, D2, D3, and D4, respectively, which increase as the distance between a respective region and cache controller 302 increases. This results in a non-uniform latency with the portions of cache 300 closer to cache controller 302 (e.g., REGION_0) having lower latencies than portions of the cache farther from the cache control circuit (e.g., REGION_1, REGION_2, and REGION_3). Data elements within a region are all accessed with a latency characteristic of the region. The latency of cache 300 is the average of the region latencies, rather than a worst case latency provided by a monolithic cache structure (e.g., cache 108). The invention contemplates variations on distribution of the cache lines across regions of different latencies. Although the regions of cache 300 have equal size, other partitioning schemes may vary region size. Note that although cache 300 illustrates TAG, CONTROL, and REGION_0, REGION_1, REGION_2, and REGION_3 as contiguous circuits, these circuits are not necessarily so located but may reside in separate areas of an integrated circuit.

Instructions or data (both referred to hereinafter as "data") are stored in cache 300 in units called a cache line, i.e., a block, write unit, fetch unit, or transfer size. The cache line is typically larger than an addressable unit (i.e., a unit addressed and/or consumed by the execution unit or processor, e.g., bytes, words, or other unit). Note that a write unit (i.e., a unit of data written to cache 300 by cache controller 302) may have a size the same as or different from a fetch unit (i.e., a unit of data fetched from cache 300 by cache controller 302). However, the following discussion assumes, without limitation, that the write unit has a size the same as the fetch unit for cache 300 and cache controller 302. An individual cache line typically includes N addressable units and associated control bits. Cache controller 302 typically accesses an entire line, although the requesting execution unit or processor (e.g., processor 306, 308, 310, or 312) may be interested in only a portion of the line (e.g., WORD_1). The lower address bits indicate which portion within the line is the addressable unit (e.g., word) of interest or critical word.

Upon a cache access, a tag (e.g., TAG) is compared to the requested address and if the data line is present, the addressable unit of interest information (e.g., CONTROL_2 of cache 300) indicates how the data line is distributed across regions of the distributed latency cache. This information may be used to fetch addressable units of the data line in a requested order from different regions of the distributed latency cache. If the addressable unit of interest is the same as the addressable unit stored in the lowest latency region, the first data received by cache controller 302 will be the addressable unit of interest. Cache controller 302 may then respond to the requesting processor without waiting for the addressable units corresponding to the remainder of the data line. Thus, the distributed latency cache may have a lower latency than a monolithic cache. However, if a mismatch occurs between the addressable unit of interest and the addressable unit stored in the lowest latency region, the data line may be provided according to the latencies of the regions, for simplicity or predictability purposes, but the requesting device must support receiving addressable units of a data line in an order other than the one requested. Another technique that handles the aforementioned mismatch provides addressable units of a data line in requested order, accounting for variable latencies as each piece is fetched.

In one embodiment of the invention, tag information and/or control information e.g., CONTROL_1 and CONTROL_2 is located on an integrated circuit to have a latency lower than associated data, i.e., tag information and/or control information is located closer to cache controller 302. In one embodiment of the invention, cache 300 is 1 MB to 16 MB. Each cache line may be 64 bytes (i.e., 512 bits) wide, which may include four, 128-bit addressable units, for an execution unit or processor that consumes 128-bit blocks of data. In another embodiment of the present invention, an execution unit or processor may consume 64-bit blocks of data and each cache line includes eight, 64-bit addressable units. Cache line widths, addressable unit sizes, and region sizes may vary according to the memory system and processor architectures. In one embodiment of the invention, cache 300 includes a 32-bit tag for a 48-bit address, three to five bits of state information in CONTROL_1, and is a 16-way set associative level-three cache. However, cache 300 may correspond to any of the memories in memory system 10 of FIG. 1. In an exemplary embodiment, L1 cache 104 is a split-cache (i.e., storing instructions and data) including a 4-way and a 2-way set associative cache, L2 cache 106 is a 16-way set associative cache, and L3 cache 108 is a 16-way set associative distributed latency cache.

Referring back to FIG. 3, in some embodiments of the present invention, techniques provide an addressable unit of interest with a high probability in the lowest latency region of the cache, i.e., a region of the cache closer to the cache control circuit than other regions of the cache (e.g., REGION_0 of cache 300). Control bits (e.g., CONTROL_2) store prediction information indicating which addressable unit of a data line is stored in a lowest latency region of a cache line. When a data line is first accessed from memory, an execution unit or processor (e.g., processor 306, 308, 310, or 312) may specify to cache controller 302 which addressable unit is the addressable unit of interest. Cache controller 302 may preserve this information and use it to store the data line in a cache line of cache 300. Cache controller 302 may also store in CONTROL_2 bits (e.g., two bits for cache 300) indicating which of the addressable units of the data line is located in the lowest latency region (e.g., REGION_0 of cache 300) of a corresponding cache line. When no prediction scheme is used, the CONTROL_2 bits may be excluded. In general, when a data line is first stored into the cache, the cache control circuit does not know with certainty which part of the data line will contain the addressable unit of interest for a subsequent access. However, empirical data for access patterns in some applications indicates that the addressable unit of interest for a subsequent cache access is likely to be the same as the addressable unit of interest for the access causing the data line to be allocated to the cache. Thus, in some embodiments of the invention, a most-recently used storage policy for data lines may be implemented, i.e., data lines are stored in a cache line with the addressable unit of interest at the time of allocation to the cache stored closest to the cache control circuit (e.g., REGION_0 of cache 300), thereby decreasing the latency for the addressable unit of interest for subsequent accesses.

Figure 4A:
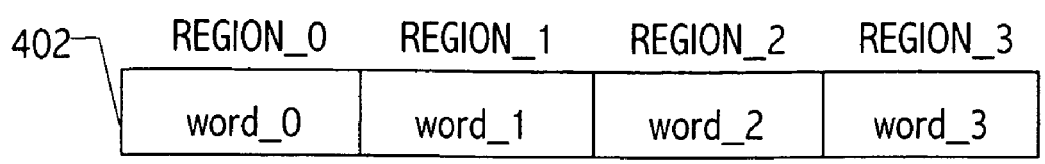
FIG. 4A illustrates multiple addressable units of a data line stored in a cache line in an order consistent with one or more embodiments of the present invention.
Figure 4B:
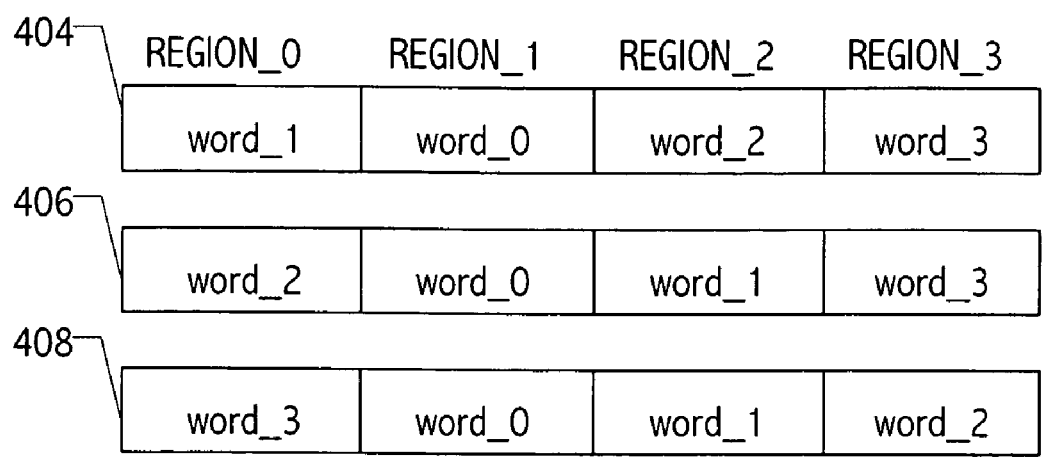
FIG. 4B illustrates multiple addressable units of a data line stored in a cache line in an order consistent with one or more embodiments of the present invention.

Referring to FIGS. 4A and 4B, cache line 402 illustrates an exemplary cache line storing addressable units (e.g., words) of a data line in a zero-word order (i.e., consecutively addressed addressable units are stored in consecutive locations of a cache memory with the least significant addressable unit of the data line being stored in a least significant region of the cache line), storing an addressable unit of interest in a lowest latency region of the cache. Cache lines 404, 406, and 408 illustrate examples of data lines stored in a non-zero-word order (i.e., the least significant addressable unit of the data line is not stored in the least significant region of the cache line), e.g., using a most-recently used policy. In an exemplary distributed latency cache, REGION_0 has a smaller latency than REGION_1, REGION_2, and REGION_3. At the time of allocation to the cache and cache line 404, WORD_1 of a data line is predicted to be the addressable unit of interest on a next access to the data line. Accordingly, WORD_1 is stored in REGION_0, the region with the lowest latency for cache line 404. Other addressable units (e.g., WORD_0, WORD_2, and WORD_3) may be stored according to any suitable criteria, e.g., a modified zero-word order, as illustrated in FIG. 4B. At the time of allocation to the cache and cache line 406, WORD_2 of a data line is the addressable unit of interest. Accordingly, WORD_2 is stored in REGION_0. Likewise, at the time of allocation to the cache and cache line 408, WORD_3 of a data line is the addressable unit of interest. Accordingly, WORD_3 is stored in REGION_0. When a data line is allocated into a distributed latency cache, information indicating the addressable unit of interest may be stored along with other control and addressing information.

Storage policies other than most-recently used may be implemented to decrease the cache latency as compared to caches without distribution of individual cache lines across regions of varying latency. For example, in some applications, the addressable unit of interest for a next cache access is likely to be a next sequential addressable unit of the addressable unit accessed to cause allocation of the data line to the cache. In particular, a storage policy of this type may be useful where the cache is an instruction cache or a split-cache (i.e., storing data and instructions) or for applications where large arrays of data are sequentially processed (e.g., in digital signal processing applications).

A scheme for storing information to the CONTROL_2 bits may vary according to cache storage policies. For example, in some embodiments of the invention, data lines may be loaded into a distributed latency cache using an inclusive strategy (i.e., loading a data line into the cache as the execution unit or processor accesses the data line for the first time) or loaded using a victim or exclusive strategy (i.e., loading a data line into the cache when the data line is evicted by a cache closer to the execution unit or processor), or by any other suitable technique. In the latter case, whether or not the evicting cache is a distributed latency cache, the evicting cache should preserve an indicator of the addressable unit of interest that was used when the data line was allocated so that this information may be used to control the placement of the data line when the data line is later loaded into a distributed latency cache.

In an exemplary memory system, a three-level cache (e.g., L3 cache 108) is the only cache that distributes cache lines across regions of varying latencies. One mode of operation fetches a requested data line into the level-one cache (e.g., L1 cache 104). The data line may be evicted to the level-two cache (e.g., L2 cache 106), and then evicted to the level-three cache. Although the level-three cache is the only one of the three caches that implements the distributed latency cache line, the level-one and level-two caches maintain the critical addressable unit information to make this information available to the level-three cache. Another mode of operation simultaneously allocates a requested data line to the level-one cache and the level-three cache. At the time of allocation, the critical addressable unit is evident and this information is stored only in the level-three cache.

In yet another mode of operation where only the level-three cache is a distributed latency cache, a requested data line is simultaneously allocated to the level-one cache and the level-three cache. At the time of allocation, the critical addressable unit is evident but this information is stored in both the level-three cache and the level-one cache. This mode accounts for eviction of the data line from the level-three cache before being evicted from the level-one cache, followed by an eviction of the data line from the level-one cache to the level-three cache. The invention contemplates other allocation and eviction policies, e.g., allocating lines to the level-two and the level-three caches simultaneously, allocating lines to the level-three cache upon eviction from the level-two cache, and additional levels of hierarchy, and storing control bits accordingly.

In one or more embodiments of the invention, data lines are prefetched to the cache prior to a request by an execution unit or processor. Although prefetching data lines provides no prediction information for a most-recently used prediction scheme, or other prediction schemes, the first access of prefetched data lines by an execution unit or processor will produce prediction information for later accesses. The prediction information may be stored after the first access of the prefetched data line. In situations where no prediction information is available (e.g., prefetching modes), a zero-word order data line storage policy may be used.

In one or more embodiments of the invention, swapping of addressable units of a cache line from one region to another (i.e., lower latency) region according to a prediction scheme may reduce realized cache latency. For example, large arrays of data may be consumed sequentially by a given application (e.g., digital signal processing applications). Upon a cache hit, the addressable unit of interest may be a word stored in the lowest latency region of the cache line. However, on subsequent cache hits, the addressable unit of interest may be the next sequential word of the data line. The cache control circuit may swap the order of the addressable units in the cache line to improve the probability that the addressable unit of interest for a subsequent access to the data line resides in the lowest latency region of the cache. The latency indicator control bits indicating the order of the addressable units stored in a cache line (e.g., CONTROL_2 of cache 300) are written to indicate the addressable unit that resides in the lowest latency region. The latency indicator control bits may be written simultaneously with other control bits (e.g., least recently used control bits or control bits used in other retention schemes), or updated by other suitable means.

Techniques described herein may be used in combination with other techniques for physically organizing a cache. For example, cache organization schemes may place cache lines that are part of the same set together in a region having particular latency characteristics or place particular ways of a set in regions having particular latency characteristics. The cache lines in these regions may then be distributed across sub-regions having different latencies. Although level three caches are typically the largest and are most likely to be affected by wire delays, the techniques disclosed herein may be applied to caches of any degree of hierarchy and to any level of a cache or other memory structure.

While circuits and physical structures are generally presumed, it is well recognized that in modern semiconductor design and fabrication, physical structures and circuits may be embodied in computer readable descriptive form suitable for use in subsequent design, test or fabrication stages. Accordingly, claims directed to traditional circuits or structures may, consistent with particular language thereof, read upon computer readable encodings and representations of same, whether embodied in media or combined with suitable reader facilities to allow fabrication, test, or design refinement of the corresponding circuits and/or structures. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer readable medium includes at least disk, tape, or other magnetic, optical, semiconductor (e.g., flash memory cards, ROM), or electronic medium and a network, wireline, wireless or other communications medium.

What is claimed is:

1. A cache memory system comprising:
   a cache memory circuit comprising:
     a first region having a first latency with respect to an access by a cache control circuit, the first latency being based at least in part on a distance between the first region and the cache control circuit; and
     at least a second region, the second region having a second latency with respect to an access by a cache control circuit, the second latency being based at least in part on a distance between the second region and the cache control circuit, the second latency being greater than the first latency;
   wherein the cache memory circuit is addressable to load and store lines of data allocated to the cache memory circuit, the lines of data comprising multiple addressable units of data; and
   wherein the cache memory circuit is organized to store a first addressable unit of an individual data line in the first region and a second addressable unit of the individual data line in the second region.

2. The cache memory system, as recited in claim 1, wherein the first and second addressable units of an individual data line are stored in a non-zero-word order based at least in part on a prediction of a requested addressable unit for a next access of the data line.

3. The cache memory system, as recited in claim 2, wherein an addressable unit of data most-recently used by an execution unit coupled to the cache control circuit is stored in the first region.

4. The cache memory system, as recited in claim 2, wherein an addressable unit of data sequentially following an addressable unit of data most-recently used by an execution unit coupled to the cache control circuit is stored in the first region.

5. The cache memory system, as recited in claim 1, wherein the cache memory circuit further comprises:
   a third region comprising control bits corresponding to individual lines of data, the control bits comprising at least one bit for identifying an addressable unit of data stored in the first region, the addressable unit of data being one of multiple addressable units of data corresponding to an individual data line.

6. The cache memory system, as recited in claim 5, wherein the control bits comprise a tag and the third region has a third latency, the third latency being at most the first latency.

7. The cache memory system, as recited in claim 1, wherein the second latency is at least one clock cycle greater than the first latency.

8. The cache memory system, as recited in claim 1, further comprising:
   the cache control circuit coupled to the cache memory circuit and coupled to at least one execution unit,
   wherein the control circuit addresses the cache memory circuit to store first and second addressable units of a data line to the first and second regions of the cache memory circuit in an order based at least in part on at least one prior access of the data line by the execution unit.

9. The cache memory system, as recited in claim 8, wherein the cache control circuit prefetches data lines to the cache memory circuit.

10. The cache memory system, as recited in claim 8, wherein the cache control circuit swaps an addressable unit of a data line stored in the first region of the cache memory circuit with an addressable unit of the data line stored in another region of the cache memory circuit, the swapping being based at least in part on a prediction of a requested addressable unit for a next access of the data line.

11. The cache memory system, as recited in claim 8, further comprising:
the execution unit coupled to the control circuit, the execution unit consuming individual addressable units of a data line.

12. The cache memory system, as recited in claim 1, embodied in computer readable descriptive form suitable for use in design, test, or fabrication of an integrated circuit.

13. A method of operating a memory system comprising:
storing a data line in a cache memory circuit, the cache memory circuit having cache lines distributed across at least a first region of the cache memory circuit and a second region of the cache memory circuit,
wherein the first region of the cache memory circuit has a first latency based at least in part on a distance between the first region and a cache control circuit; and
wherein the second region of the cache memory circuit has a second latency based at least in part on a distance between the second region and the cache control circuit, the second latency being greater than the first latency.

14. The method, as recited in claim 13, wherein the second latency is at least one clock cycle greater than the first latency.

15. The method, as recited in claim 13, wherein the storing comprises:
storing at least a first addressable unit of the data line in the first region of the cache memory circuit; and
storing a second addressable unit of the data line in the second region of the cache memory circuit.

16. The method, as recited in claim 13, further comprising:
predicting a next requested addressable unit of the data line, the prediction being based at least in part on a prior access of the data line and the storing being at least partially based on the prediction.

17. The method, as recited in claim 16, wherein the first addressable unit of the data line is more recently used by an execution unit than the second addressable unit of the data line.

18. The method, as recited in claim 13, further comprising:
storing to a third region of the cache memory circuit an indicator of an order that addressable units of a data line are stored in an individual cache line.

19. The method, as recited in claim 13, further comprising:
requesting the first addressable unit of a data line by an execution unit; and
providing the first addressable unit of the data line, by the cache control circuit to the execution unit, without awaiting arrival of the second addressable unit of the data line at the cache control circuit from the cache memory circuit.

20. The method, as recited in claim 13, further comprising:
prefetching data lines to the cache memory circuit.

21. The method, as recited in claim 13, further comprising:
swapping an addressable unit of a data line stored in the first region of the cache memory circuit with an addressable unit of the data line stored in another region of the cache memory circuit, the swapping being based at least in part on a prediction of a requested addressable unit for a next access of the data line.

22. A method of manufacturing a memory system comprising:
forming a cache control circuit;
forming at least one execution unit coupled to the cache control circuit;
forming a cache memory circuit comprising a plurality of cache lines, at least one cache line comprising at least a first portion and a second portion, the first and second portions storing respective ones of first and second addressable units of an individual data line;
forming a first set of conductors coupling the first portion of the cache line to the cache control circuit;
forming a second set of conductors coupling the second portion of the cache line to the cache control circuit;
wherein the first set of conductors are associated with a first delay and the second set of conductors are associated with a second delay, the second delay being greater than the first delay.

23. The method, as recited in claim 22, wherein at least a portion of the first and second addressable units of an individual data line are stored in a non-zero-word order.

24. The method, as recited in claim 22, wherein the cache memory circuit further comprises:
forming control bits corresponding to the cache line, the control bits comprising at least one bit for identifying which of a plurality of addressable units of the individual data line is stored in the first portion.

25. The method, as recited in claim 22, wherein the second delay is at least one clock cycle greater than the first delay.

26. An apparatus comprising:
means for storing multiple addressable units of a data line in at least a first region of an integrated circuit and a second region of an integrated circuit;
means for controlling the means for storing;
means for coupling the first region to the means for controlling;
means for coupling the second region to the means for controlling;
wherein the first region of the integrated circuit has a first latency based at least in part on a distance between the first region and the means for controlling; and
wherein the second region of the integrated circuit has a second latency based at least in part on a distance between the second region and the means for controlling, the second latency being greater than the first latency.

27. The apparatus, as recited in claim 26, further comprising:
means for predicting a next requested addressable unit of the data line.

28. The apparatus, as recited in claim 26, further comprising:
means for identifying an addressable unit of data stored in the first portion, the addressable unit of data being one of the multiple addressable units of a data line.

29. The apparatus, as recited in claim 26, wherein at least a portion of the data line is stored in a non-zero-word order.

* * * * *